Dec. 4, 1923.

G. C. HAFFNER 1,476,158

PSYCHIC INSTRUMENT

Filed Nov. 26, 1921

Inventor:
G.C. Haffner:
by Hazard and Miller
Attys.

Patented Dec. 4, 1923.

1,476,158

UNITED STATES PATENT OFFICE.

GROVER C. HAFFNER, OF LOS ANGELES, CALIFORNIA.

PSYCHIC INSTRUMENT.

Application filed November 26, 1921. Serial No. 518,030.

*To all whom it may concern:*

Be it known that I, GROVER C. HAFFNER, a citizen of the United States, residing at Los Angeles, in the county of Los Angeles and State of California, have invented new and useful Improvements in Psychic Instruments, of which the following is a specification.

My invention relates to psychic instruments more commonly known as ouija boards, and a purpose of my invention is the provision of an instrument of this character comprising a board containing thereon legends and indicia, and which is tiltable to operate an indicator for obtaining mediumistic messages.

I will describe one form of instrument embodying my invention and will then point out the novel features thereof in claims.

In the accompanying drawings.

Figure 1:
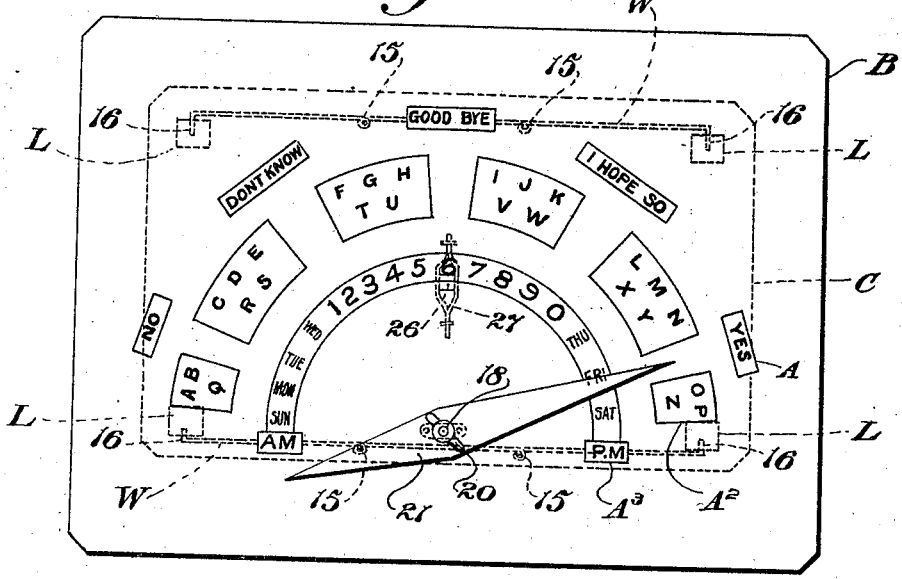
Figure 1 is a view showing in top plan one form of instrument embodying my invention.
Figure 2:
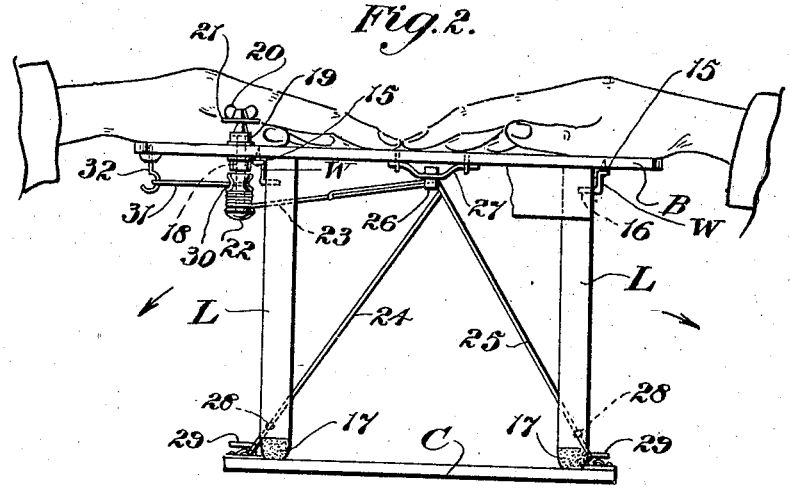
Fig. 2 is a view showing the instrument in end elevation.

Referring specifically to the drawings in which similar reference characters refer to similar parts, my invention, in its present embodiment, comprises a table including a board B supported upon legs L which are suitably braced with respect to the board and to each other by means of wires W which, as clearly shown in Fig. 1, are looped at the points indicated at 15 to receive screws for securing the wires to the board. The ends of the wires are formed with lateral extensions 16 adapted to penetrate the legs L and to thereby securely hold the legs to the board B. As shown in Fig. 2, the table is adapted to be supported upon a base board C, and to facilitate the tilting of the table upon the board, the lower ends of the legs are rounded and preferably covered with rubber caps 17.

As illustrated to advantage in Fig. 2, a shaft 18 extends through the board B and is journaled in bearings 19 secured to the opposite sides of the board. The upper end of the shaft 18 is threaded to receive a wing nut 20 for clamping a pointer or indicator 21 thereon, so that when the shaft is rotated the pointer will be moved over the board B. The lower end of the shaft 18 is provided with a pulley 22 fixed to the shaft for rotation therewith and above which is trained a cord 23 having branch portions 24 and 25 which pass through a ring 26 secured to the under side of the board B by wires 27. The ends of the cords 24 and 25 are looped as indicated at 28 and are connected to pins 29 secured to the base board C.

By this arrangement it will be seen that with the table in position upon the board C as shown in Fig. 2, any tilting movement in the direction of the arrows will effect rotation of the pulley 22 through the medium of the cords 23, 24 and 25 by virtue of the fact that the ends of the cords 24 and 25 are fixed. Rotation of the pulley 22 obviously effects rotation of the shaft 18, and the latter in turn causes rotation of the pointer 21 about the shaft 18 as a center.

For normally maintaining the pointer in a definite position upon the board B, a second pulley 30 is fixed to the shaft 18, and to this pulley is anchored one end of an elastic cord 31, the opposite end of the latter being secured to a hook 32 sustained on the board B. The elastic cord 31 serves to urge the pulley 30 and consequently the shaft 18 to a definite position so that the pointer 21 is caused to occupy a corresponding position. It is to be understood however that the tension of the cord 31 permits rotation of the shaft 18 when the table is tilted to effect movement of the pointer over the board. However, when the table is restored to perpendicular position, the elastic cord 31 operates to return the pointer to normal position upon the board.

As shown in Fig. 1, the board B is provided with the legends and indicia arranged in the form of arcs which are concentric to each other and to the axis of the pointer 21. In the present instance I have shown three arcs, the outermost arc indicated at A being a legend arc, and the two innermost designated at $A^2$ and $A^3$, respectively, being indicia arcs. The indicia arc $A^2$ contains the letters of the alphabet, while the arc $A^3$ contains numerals from one to ten, the days of the week, with time symbols A. M. and P. M. at the ends of the arc. It will be understood that these legends and indicia are employed in obtaining the mediumistic messages and through the operation of the pointer 21.

In the operation of the instrument, two persons place their hands upon the board B in the manner shown in Fig. 2, and by tilting of the table in either direction, the pointer is moved over the board to indicate different legends or indicia whereby the mediumistic messages are obtained. It is to be particularly noted that irrespective of the direction in which the table is tilted, the pointer moves counter clockwise over the board as when viewed in Fig. 1, this action of course being against the tension of the elastic cord 31 so that when the table occupies a perpendicular position, the pointer will be restored to its normal position.

Although I have herein shown and described only one form of instrument embodying my invention, it is to be understood that various changes and modifications may be made herein without departing from the spirit of the invention and the spirit and scope of the appended claims.

I claim as my invention:

1. An instrument of the character described comprising a table mounted for tilting movement an indicator mounted for movement over the table, and means connected to the indicator and associated with the table so as to be operable by tilting of the table to effect movement of the indicator.

2. An instrument of the character described comprising a table mounted for tilting movement in two directions, an indicator pivotally mounted for rotational movement on the table, and means connected to the indicator and associated with the table to effect movement of the indicator in one direction when the table is tilted.

3. An instrument of the character described comprising a table mounted for tilting movement, an indicator pivotally mounted to occupy various positions upon the table, means for urging the indicator to a definite position upon the table, and means connected to the indicator and associated with the table so as to be operable by tilting of the table to effect movement of the indicator against the action of said urging means.

4. An instrument of the character described comprising a table mounted for tilting movement, an indicator rotatably mounted on the table, means for urging the indicator to a definite position upon the table, and means connected to the indicator and associated with the table so as to be operable by tilting of the table in two directions to effect movement of the indicator in one direction against the action of said urging means.

5. An instrument of the character described comprising a table including a board, and legs having rounded ends, a base board for supporting the table, an indicator rotatably mounted in the board of the table for movement over the board, means for urging the indicator to a definite indicating position on the board, and means connecting said base board and said indicator to effect movement of the latter against the action of said urging means when the table is tilted upon the base board.

6. An instrument of the character described comprising a table including a board having indicia and legends thereon, legs for supporting the board and having rounded free ends, a base board for supporting the table, a shaft journaled in the table board, an indicator carried by the shaft for movement over the board, means for urging the shaft to cause the indicator to occupy a definite indicating position on the board, and flexible connections between said shaft and base board for effecting movement of the indicator in one direction and against the action of said urging means when the table is tilted in either of two directions.

7. An instrument of the character described comprising a board mounted for tilting movement and having thereon indicia and legends arranged in concentric arcs, an indicator rotatably mounted on the board at a point axially with respect to circles defined by the arcs, and means connected to the indicator and associated with the board for actuating the indicator by tilting the board.

8. An instrument of the character described comprising a board, mounted for tilting movement, an indicator pivoted for movement over the board, and flexible means connected to the indicator and associated with the board to effect movement of the indicator when the board is tilted.

9. An instrument of the character described comprising a board having rockable portions to allow tilting of the board, an indicator pivoted for movement over the board, and flexible means connected to the indicator and associated with the board for effecting movement of the indicator when the board is tilted.

In testimony whereof I have signed my name to this specification.

GROVER C. HAFFNER.